Jan. 17, 1928.  1,656,848

DE WITT H. WYATT
VISIBLE TOASTER
Filed Feb. 23, 1924  2 Sheets-Sheet 1

DEWITT H. WYATT INVENTOR.

BY
Edwin P. Corbett ATTORNEY.

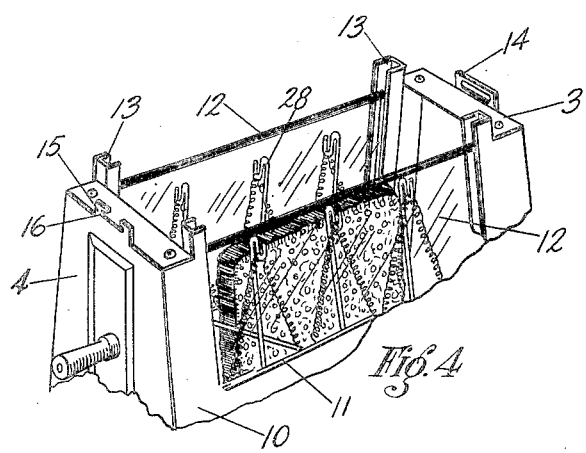
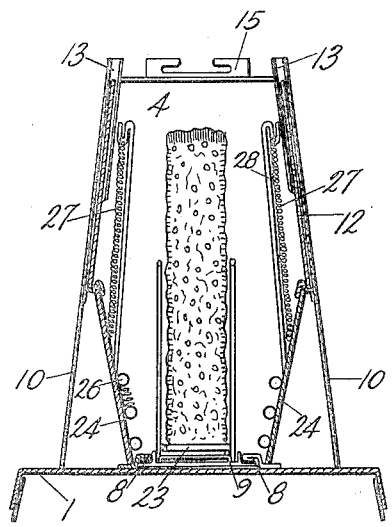
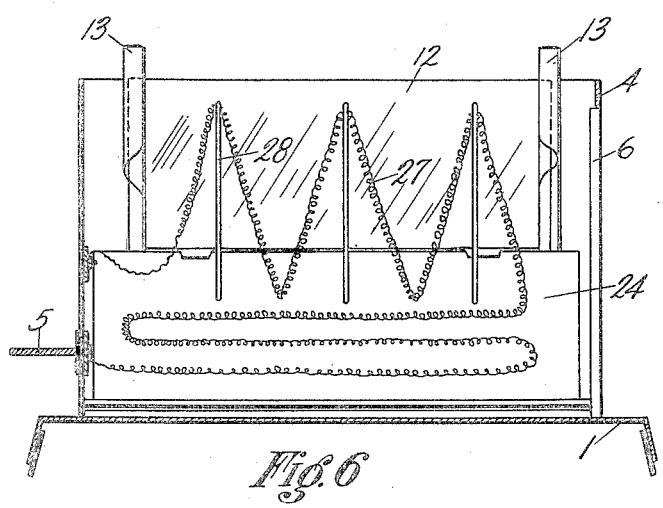
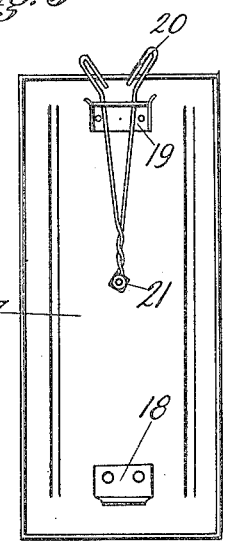

Patented Jan. 17, 1928.

1,656,848

UNITED STATES PATENT OFFICE.

DE WITT H. WYATT, OF COLUMBUS, OHIO.

VISIBILE TOASTER.

Application filed February 23, 1924. Serial No. 694,502.

My invention relates to a visible toaster and has to do particularly with the provision of a novel combination of apparatus whereby the article being toasted may be toasted upon both sides simultaneously and the toasting process rendered visible.

In the past, various methods and means have been used in an attempt to toast bread quickly and with an equal distribution over the surface of the bread, and most of these former attempts have utilized electric resistance elements for supplying the heat necessary to toast the bread. Some of these methods have involved the placing of two slices of bread adjacent heating elements which have been positioned at the center of the toaster. Other methods have contemplated the positioning of the slices of bread between two heating elements to simultaneously heat both sides of the bread and to enclose the entire structure including the heating elements and the bread being toasted. All of these efforts of the past have apparently failed in the toasting of bread to just the desired amount for the reason that it has been impossible to determine when one or both sides of the bread were sufficiently toasted. In other words, when one side of the bread is toasted at a time it is impossible to see through such slices of bread to observe the conditions on the other side or when both sides of the bread are toasted it has been impossible to see the process of toasting on account of the enclosing means surrounding the entire device, in addition to the non-transparency of the mica heating elements. Furthermore, equal distribution of heat and an equalization of the toasting has not been obtained for the reason that it has been the practice to either position the bread directly upon the heating elements or immediately adjacent such elements whereby the bread is toasted more in one spot than another.

My invention contemplates the provision of means for positioning a slice of bread or other article to be toasted and for rendering said slice of bread completely visible during the entire process of toasting, whereby the toasted bread can be removed at the instant the toasting is completed without having to wait for smoking or charring of the bread surface to indicate the completion of the toasting process. Furthermore, by my device, the toast is not only visibly toasted on each side simultaneously but the structure is such that all the heat is initially enclosed within the toaster and utilized for the toasting of the bread. Moreover, my invention is such that the heat is equally distributed over the surface of the bread and the bread is toasted on both sides to an equal color.

My general enclosing toaster structure is preferably provided with panes of glass on each side whereby both surfaces of the slice of bread may be directly observed. Suitable means is provided for the reception and positioning of a slice or slices of bread and which means is preferably slidable longitudinally in the toaster and obviously in between the two panes of glass. Therefore, I have provided such an enclosing toaster structure that when the slide is inserted within the toaster the toaster will be entirely enclosed on all sides, with the exception of suitable ventilation spaces. Furthermore, I have provided heating elements that are so arranged and positioned as to radiate and distribute heat equally over the surface of the bread being toasted without interfering with the visibility of either side of the toast during the toasting action.

Many other features of advantageous and various novel structural characteristics of my invention will appear as this description progresses. The preferred embodiment of my invention is shown in the accompanying drawings wherein similar characters of reference designate corresponding parts and wherein:

Figure 4 is a fragmentary perspective view similar to Figure 1 but showing the top of the toaster removed and also showing a modified manner of arranging the heating elements.

Figure 5 is a vertical cross section of the structure shown in Figure 1 and showing in detail the manner of arranging the modified form of heating elements so as to heat without interfering with visibility.

Figure 6 is a vertical longitudinal section of the structure shown in Figure 4 showing in detail one manner of arranging the heating elements.

Figure 7 is an inverted plan view of the bottom part of the top of the toaster structure.

Figure 1:
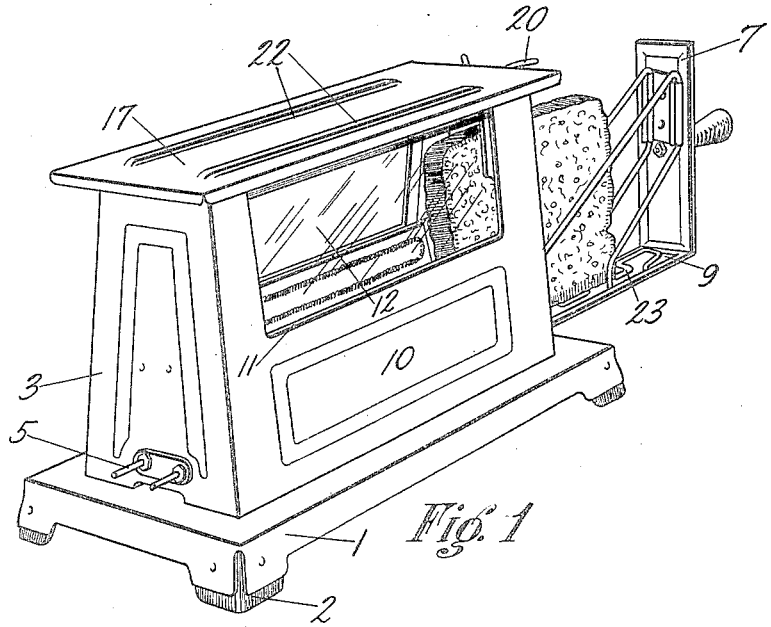
Figure 1 is a perspective view of my complete toaster unit and showing a means for positioning the bread between the heating elements and the means for rendering the bread visible during the toasting process.

In the drawings and with particular reference to Figure 1, the base of my general toaster structure may be designated 1. This base is preferably rectangular in shape and is provided at each corner with suitable non-conducting elements 2 preferably of such structure as will not mar any supporting surface.

Figures 2, 3:
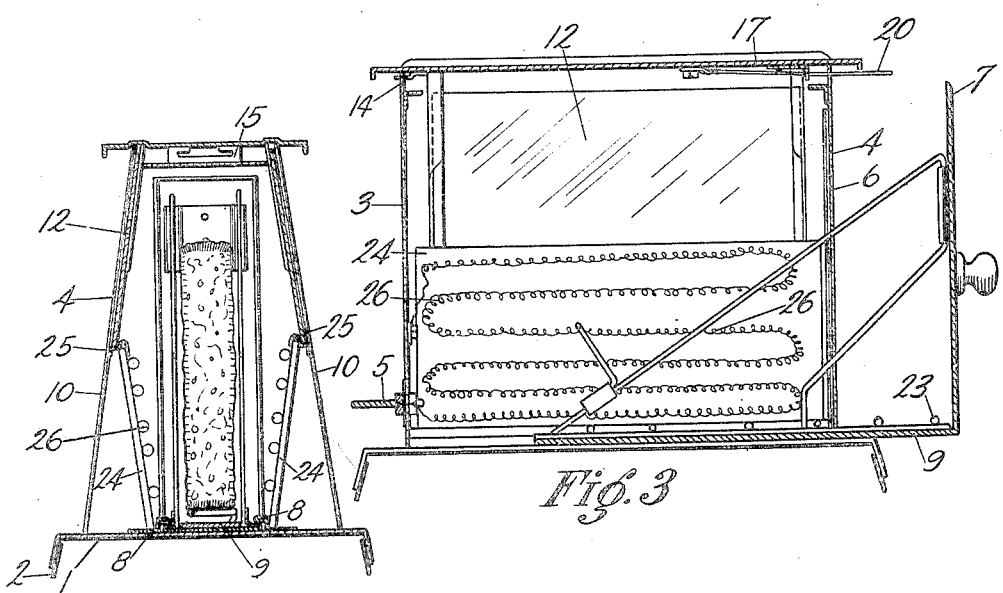
Figure 2 is a vertical cross section of the structure shown in Figure 1 and showing in detail the manner of positioning the bread within the toaster and the general arrangement of the heating elements to evenly heat the bread without interfering with visibility.
Figure 3 is a longitudinal vertical section of the structure shown in Figure 1 and showing in detail the novel combination and arrangement of the heating element upon one side of the toaster and the pane of glass above the heating element.

Connected to the base 1 in any suitable manner are the ends 3 and 4, the one end 3 being provided with a standard plug connection 5 while the other end 4 is provided with an opening or aperture 6 for the suitable reception of a toast rack 7. As best shown in Figure 2, the base 1 is also provided with suitable guides 8. The rack 7 is provided with a base 9, the edges of which extend horizontally underneath the guides 8.

The base 1 is also provided with suitable sides 10 which are preferably inclined upwardly and inwardly. These sides 10 may be joined to or form a part of the base 1 and the ends 3 and 4 in any suitable manner. The top part of each side 10 is preferably cut away as at 11 for the reception of a pane of glass 12. The sides 10 are also preferably provided with suitable members 13 which not only serve as grooves or guides for the glass sides but which extend up a short distance above the top of the sides 3 and 4. As best shown in Figure 4, the tops of the glass sides 12 and the tops of the ends 3 and 4 are preferably in the same horizontal plane.

The end member 3 is provided with an upwardly extending apertured lug 14 and the end member 4 is provided with a similarly positioned lug 15, which is provided with a T opening 16 instead of being apertured. A suitable top 17, as shown in detail in Figure 7, is provided at one end and on the bottom surface thereof with a lug 18. The other end of the top 17 is provided with a lug 19 which guides and positions a suitable spring clip 20 which is secured to the top 17 as at 21. The lug 18 is designed to be inserted in the aperture of the upstanding lug 14 and the ends of the spring clip 20 are designed to fit into and be positioned in the T-shaped groove of the lug 15. It will thus be obvious that I have provided a quickly removable top, which when removed will enable the glass sides 12 to be removed from the guides 13 and cleaned. It will also be noted that the top 7 is positioned a slight distance above the top of the glass sides 12 and the ends 3 and 4 so as to provide a suitable ventilation space for the outlet of the heated air. The top 17 is provided with suitable upstanding ridges 22 to suitably support the bread when toasted and to prevent burning of such finished toast.

The toast rack 7 is provided with suitable springs or supporting means 23 for positioning the slice of bread slightly above the base 9 of the rack and for the purpose of providing an air and ventilation space beneath the slice of bread. Positioned upon each side of the guides 8 for the sliding base 9, I have provided suitable insulating members 24, as best shown in Figures 2 and 5. These insulating members are preferably formed of any material which is a heat resisting insulator with a refractory surface, and in the present instance I preferably use a specially fabricated asbestos board in contrast to the relatively expensive mica commonly used as an insulator only in electrical resistance heating. As shown in Figure 2, the insulating members 24 are secured to the sides 10 by suitable clips 25, which clips are positioned immediately below the bottom edges of the glass sides 12. These insulating members 24 are preferably positioned to slant upwardly and downwardly whereby the bottom portions of each insulator and radiating member will be closer to the slice of bread than the top portions of such members.

As shown in Figures 2 and 3, the insulating and radiating members 24 are provided with suitable electrical resistance heating elements 26. These heating elements 26 are preferably in the form of a continuous coil and one end of such continuous coil is connected to one terminal of the plug connection 5 and is arranged back and forth along the surface of one insulating and radiating member 24 from where it extends to the other side of the toaster and is arranged in a suitable manner upon the surface of the insulating and radiating member 24 and is then connected to the other terminal of the same standard plug connection 5. It will be obvious that with the heating elements arranged as shown and slanting upwardly and downwardly that the heated air will pass upwardly to heat and toast the entire surface of the bread evenly. It will also be obvious that as the air is cooler at the bottom of the toaster that it will be necessary to position the heating elements at the bottom of the toaster closer to the vertical slice of bread and the heating elements at the top of the toaster, and it will be furthermore obvious that such heating elements may be of such a nature and of such a size that more heat may be given off at certain points than at other points. In any event, the bread will be preferably evenly heated by heated air instead of being directly heated in spots, as would be the case if the heating elements were positioned immediately adjacent the slices of bread.

In the normal use of my visible toaster, the toast rack 7 is withdrawn for the insertion of a slice or slices of bread and is moved inwardly by means of the cooperative relation between the base 9 of the rack and the guides 8. The toast rack 7 and therefore the slice of bread will be vertically and centrally positioned within the toaster element, and when the toast rack is pushed to its innermost position the toast will be entirely enclosed, with the exception of suitable ventilation space. Suitable electric current passing through the resistance coils 26 will cause the coils to be heated. As the toast is positioned centrally between the coils, such heated coils and the refractory surface of the elements 24 will heat the air and the toast evenly. The enclosing of the toast will conserve the maximum amount of heat and produce a more rapid and even toasting of the bread. When the bread is first inserted in the toaster such slice of bread is completely visible from both sides during the entire process of toasting, whereby it is possible to observe the surfaces of both sides of the slices of bread and to see these surfaces gradually turn in color and toast.

In the modified structure shown in Figures 4, 5 and 6 the insulating and refracting elements 24 are provided with horizontally arranged heating elements 26, which preferably extend upwardly about half way of such elements 24 and are then arranged to extend in a generally vertical direction as at 27. Suitable supporting arms 28 are secured to the inner surface of the insulating and refracting elements 24 and extend upwardly towards the tops of the glass sides 12. These supporting elements 28 are provided with suitable hooks at their upper ends whereby the continuous heating element may be suitably positioned to radiate enough heat to toast the bread and at the same time give a clear view of the bread being toasted. In this modified arrangement of heating element as well as in the arrangement shown in Figure 2, the heating elements may be of different size at both places, whereby different amounts of heat will be given out by such elements at different predetermined positions. In both structures as shown in Figure 5 and Figure 2, the heating elements are effective to heat the air within the enclosed toaster so that the heated air contacting with the bottom part of the toast will be of substantially the same temperature as the heated air contacting with the top part of the toaster whereby both surfaces of the slice of bread will be toasted equally and uniformly by the heated air and the radiated and refracted heat from the heating elements and the refractory surface 24. It will also be obvious that the heating elements are preferably arranged and of such size that the bottom part of the bread will be heated more by the radiation and refraction of the heat by the heating elements 26 and the refractory surface 24, while the top part of the slice of bread will be heated more by the heat or by conduction or convection.

It will be understood that the continuous element 26 may be of any desired form and may be arranged upon the inclined surface 4 in any manner or may extend upwardly along the sides of the glass panes 12 so that such elements will toast the bread without impairing the view of the bread being toasted. It will also be understood that two slices of bread may be inserted in my toaster side by side with a suitable heating element positioned in between the two slices of bread or it will be understood that the toaster may be of such a length that two or more slices of bread may be inserted end to end in the toast rack 7. It will also be understood that any heating elements, such as the elements 27 which extend upwardly above the refractory supporting surface 24 will preferably be formed so as to radiate less heat than the heating elements which are arranged adjacent to the bottom of the slice of bread, for the reason that the bottom of the bread being toasted is designed to be preferably heated almost entirely by radiation and refraction from the heating elements, while the top or the upper surface of the bread is designed to be heated by conduction or convection of the heat, that is the heating elements will heat the air while the air will in turn heat and toast the upper part of the bread. Thus by adding additional heating elements such as 27 adjacent the upper part of the bread I have provided means for assisting this conduction or convection of heat to toast the upper part of the bread.

It will be apparent that I have provided an extremely simple and compact toaster structure that will be effective to render the toasting process entirely visible from the beginning to end. It will also be obvious that I have provided heating elements and refractory means for supporting such heating elements whereby the surfaces of both sides of the bread will be evenly toasted at the same time. It will further be obvious that the combination of my enclosed visible structure with the arrangement of the heating elements will conserve the maximum amount of heat and utilize such heat to evenly heat the slice of bread by virtue of the heated air.

Having thus described my invention what I claim is:

1. A device of the class described comprising heating elements, means for positioning the bread between the said elements, said elements being adapted to radiate heat to toast said bread and downwardly and inwardly inclined supporting means for said elements for reflecting a portion of the heat from said elements to toast the bread.

2. A device of the class described comprising heating elements, a slide for positioning the bread between the said elements, said elements being adapted to radiate heat to toast said bread and supporting means for said elements for reflecting a portion of the heat from said elements to toast the bread, the sides of said device being transparent to render said toasting process visible.

3. A device of the class described comprising means for rendering the bread visible during toasting and heating elements arranged on refracting plates which are positioned to be opposite the lower portions of the bread only whereby to heat the bottom portion of the bread surfaces by radiation and the top portion by convection.

In testimony whereof I hereby affix my signature.

DE WITT H. WYATT.